US006966224B2

(12) United States Patent
Yan et al.

(10) Patent No.: US 6,966,224 B2
(45) Date of Patent: Nov. 22, 2005

(54) MICROMACHINED VIBRATORY GYROSCOPE WITH ELECTROSTATIC COUPLING

(75) Inventors: Hai Yan, Fontana, CA (US); Roland Burghardt, Frankfurt (DE); Bernhard Hartmann, München (DE); Konrad Kapser, München (DE); Matthias Rose, Kirchseeon (DE)

(73) Assignees: BEI Technologies, Inc., San Francisco, CA (US); Conti Temic Microelectronic GmgH, Munich (DE); Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/792,043

(22) Filed: Mar. 2, 2004

(65) Prior Publication Data

US 2004/0173023 A1    Sep. 9, 2004

Related U.S. Application Data

(60) Provisional application No. 60/453,033, filed on Mar. 6, 2003.

(51) Int. Cl.[7] .............................................. G01P 9/04
(52) U.S. Cl. ................................ 73/504.14; 73/504.04
(58) Field of Search ...................... 73/504.04, 504.12, 73/504.02, 504.14, 504.15

(56) References Cited

U.S. PATENT DOCUMENTS 5,349,855 A    9/1994   Bernstein et al.

(Continued)

FOREIGN PATENT DOCUMENTS

WO    WO 95/34798 A1    12/1995

OTHER PUBLICATIONS

Wang et al., "A Silicon Rate Sensor with Closed-Loop Drive and Sense Circuits", Nov. 15-21, 2003, IMECE2003-42539, ASME International Mechanical Engineering Congress.

Primary Examiner—Helen Kwok
(74) Attorney, Agent, or Firm—Edward S. Wright

(57) ABSTRACT

Micromachined vibratory gyroscope having two or more coplanar movable masses suspended over a planar substrate. Two perpendicular axes (x and y) are defined within the substrate plane, while a third, the z-axis or input axis, is defined to be perpendicular to the substrate plane. The movements of the two masses along the x-axis are coupled through an electrostatic coupling means so that the natural resonant frequency of the in-phase mode and that of the anti-phase mode are separated from each other for the resonances along the x-axis. When the two masses are driven to vibrate along the x-axis in the anti-phase mode and the device experiences rotation about the z-axis, Coriolis forces act differentially on the masses in the Y-direction, causing the two masses to dither in an anti-phase motion along the y-axis. The anti-phase dithering along the y-axis can be sensed directly by a rate sensor to measure the rate of rotation about the z-axis. Alternatively, the anti-phase dithering of the first and second bodies along the y-axis can be transferred to other movable bodies (i.e., rate-sensing masses) whose movement is then sensed to measure the rate of rotation about the z-axis. The sensing bodies are preferably suspended in such manner that, in the absence of Coriolis forces, the x-axis motion of the vibrating masses does not affect the sensing bodies. That inhibits motion of the sensing bodies in response to linear acceleration within the plane of the substrate, but permits those bodies to respond readily to the Coriolis-induced motion about an axis perpendicular to the substrate plane.

27 Claims, 5 Drawing Sheets

U.S. PATENT DOCUMENTS

| | | |
|---|---|---|
| 5,359,893 A | 11/1994 | Dunn |
| 5,505,084 A | 4/1996 | Greiff et al. |
| 5,530,342 A * | 6/1996 | Murphy .................. 324/158.1 |
| 5,635,638 A | 6/1997 | Geen |
| 5,757,103 A | 5/1998 | Lee et al. |
| 5,780,739 A | 7/1998 | Kang et al. |
| 5,780,740 A | 7/1998 | Lee et al. |
| 5,895,850 A | 4/1999 | Buestgens |
| 5,992,233 A | 11/1999 | Clark |
| 6,189,381 B1 | 2/2001 | Huang et al. |
| 6,230,563 B1 | 5/2001 | Clark et al. |
| 6,250,156 B1 | 6/2001 | Seshia et al. |
| 6,257,059 B1 | 7/2001 | Weinberg et al. |
| 6,621,279 B2 * | 9/2003 | Ward ......................... 324/684 |

* cited by examiner

MICROMACHINED VIBRATORY GYROSCOPE WITH ELECTROSTATIC COUPLING

RELATED APPLICATION

Provisional Application No. 60/453,033, filed Mar. 6, 2003, the priority of which is claimed.

BACKGROUND OF THE INVENTION

1. Field of Invention

The invention pertains generally to inertial sensors and the like and, more particularly to a micromachined vibratory gyroscope.

2. Related Art

Vibratory gyroscopes operate by detecting Coriolis-induced motion induced by rotation of the gyroscope about a sensitive axis. When a mass is driven to oscillate along an given axis and is rotated about an axis perpendicular to the axis of vibration, a Coriolis force is generated and applied to the mass along a response axis perpendicular to the axes of vibration and rotation. The rate of rotation is measured by detecting the change in motion of the mass along the response axis caused by the Coriolis force.

Coriolis-induced forces on the vibrating masses are in phase with the velocity of the masses since the Coriolis force is proportional to the velocity. Any undesired coupling of the motion along the primary or driven axis of vibration to the response axis will give rise to a spurious motion of the masses along the response axis. This undesired coupling is generally in phase with the displacement of the masses, rather than velocity, and is often referred to as a quadrature error.

One way to sense a change in motion of a mass due to a Coriolis force is capacitive detection, which typically involves a fixed electrode and a movable electrode. In such devices, it is important to minimize motion of the movable electrode in the absence of applied rotation, i.e., any motion of the mass along the response axis which is not due to a Coriolis force. Otherwise, an undesired quadrature signal will be present, having the same frequency as the rate signal but phase shifted by 90 degrees. This quadrature signal is superimposed on the desired output signal. Although the quadrature signal can be partially rejected electronically, e.g. by the use of phase-sensitive demodulation, that tends to degrade the performance of the gyroscope.

Another source of error in a vibratory gyroscope is sensitivity to linear accelerations which displace the masses thus produce undesired outputs.

When a gyroscope is mounted on a support for a given application, any unbalanced momentum of the vibrating masses will cause part of the driving energy to be injected into the support and then potentially be coupled back to the device. Energy fed back in that manner can cause bias errors and makes the performance of the device sensitive to the mounting conditions.

In micromachined vibratory gyroscopes of the prior art, the vibrating masses are generally coupled together by mechanical means. The coupling is important in order to assure that the masses will oscillate at the same frequency of resonance. Uncoupled masses would tend to have different resonant frequencies, which would not be conducive to a practical sensor.

While mechanical coupling does assure the masses will vibrate with a single frequency of resonance, such couplings also have certain limitations and disadvantages. For example, they are prone to variations in dimension due to fabrication tolerances, causing the degree of coupling to be variable. Also, many of them employ folded beam designs which increase the required substrate area and size of the device. Moreover, the degree of coupling is determined by the fixed mechanical properties of the coupling structure, and is not adjustable.

OBJECTS AND SUMMARY OF THE INVENTION

It is, in general, an object of the invention to provide a new and improved micromachined vibratory gyroscope.

Another object of the invention is to provide a gyroscope of the above character which does not require mechanical coupling between the vibrating masses.

Another object of the invention is to provide a gyroscope of the above character in which the vibrating masses are coupled electrostatically.

These and other objects are achieved in accordance with the invention by providing a micromachined vibratory gyroscope in which the vibrating masses are coupled electrostatically, e.g. by parallel-plate capacitors. Such coupling is used between the masses themselves as well as between the masses and other bodies used for sensing the response to rotation. This type of coupling is less prone to variation than mechanical coupling, and can be adjusted by varying bias voltages, if necessary.

DETAILED DESCRIPTION

Figure 1:
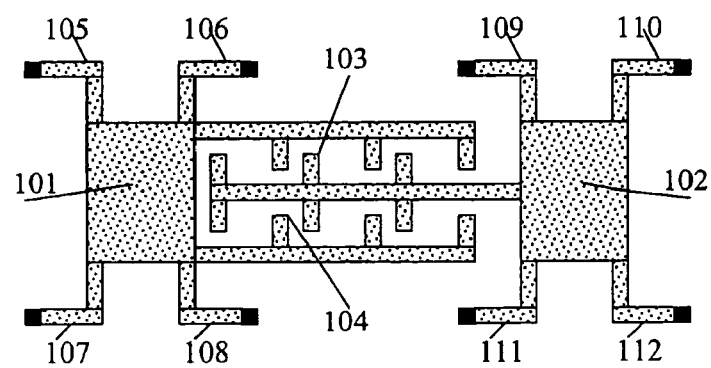
FIGS. 1–6 are top plan views, somewhat schematic, of different embodiments of a micromachined vibratory gyroscope incorporating the invention.
Figure 1:
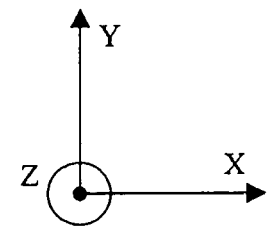

In the embodiment of FIG. 1, two masses are coupled together directly using electrostatic force that is a function of the relative positions of the two masses. The coupling capacitor is asymmetrical, with a capacitance which increases when the masses move toward one another, and decreases when they move apart.

In this embodiment, masses 101, 102 are suspended by beams 105–108 and 109–112, respectively, with one end of each beam being anchored to a substrate. Each of the beams is L-shaped, with arms extending in the x- and y-directions. This suspension allows masses 101, 102 to move in the directions of the x-axis and the y-axis. Mass 101 preferably matches mass 102, and beams 105–108 preferably match beams 109–112.

Plates 103, 104 are connected to masses 101, 102 in spaced parallel relationship and constitute the electrodes or plates of a capacitor. When a voltage is applied, the electrostatic force between them is a function of the relative positions of masses 101, 102 along the x-axis. That force can be approximated as a spring between the two masses having a negative spring constant.

When masses 101, 102 are driven to dither in an in-phase along the x-axis, the resonance frequency is determined by the spring constants of beams 105–108 and 109–112. When masses 101, 102 are driven to dither in an anti-phase mode along the x-axis, the two masses move alternately toward and away from each other, changing their relative positions. In this case, the resonance frequency is determined not only by the spring constants of the beams, but also by the negative spring constant induced by the electrostatic force applied between the two masses. Thus, by applying a voltage difference across the two masses, the resonance frequency of the anti-phase mode in the x-direction can be modified and separated from the resonance frequency of the in-phase mode in the x-direction.

Figure 1A:
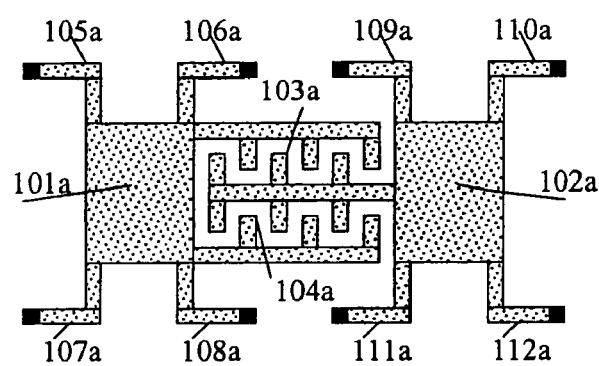
Figure 1A:
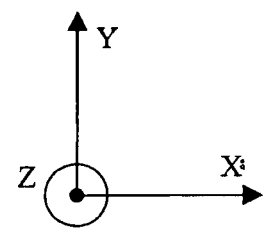

The embodiment of FIG. 1a is similar to the embodiment of FIG. 1 except that the coupling capacitor is symmetrical, with the change in capacitance being approximately equal for equal motions of the masses toward and away from each other.

As in the embodiment of FIG. 1, the attractive force between the plates of the capacitor increases as the masses move toward each other, and in additional to providing equal changes in capacitance with movement in either direction, the symmetrical capacitor also tends to produce a more linear relationship between the capacitance and the displacement of the masses.

Alternatively, the beams in the embodiments of FIGS. 1 and 1a can be modified to permit motion along the z-axis, rather than the y-axis. The Coriolis-induced motion will then be directed along the z-axis, and the y-axis will be the input axis about which rotation is sensed. Thus, the input axis will be in the plane of the device rather than being perpendicular to it.

Figure 1B:
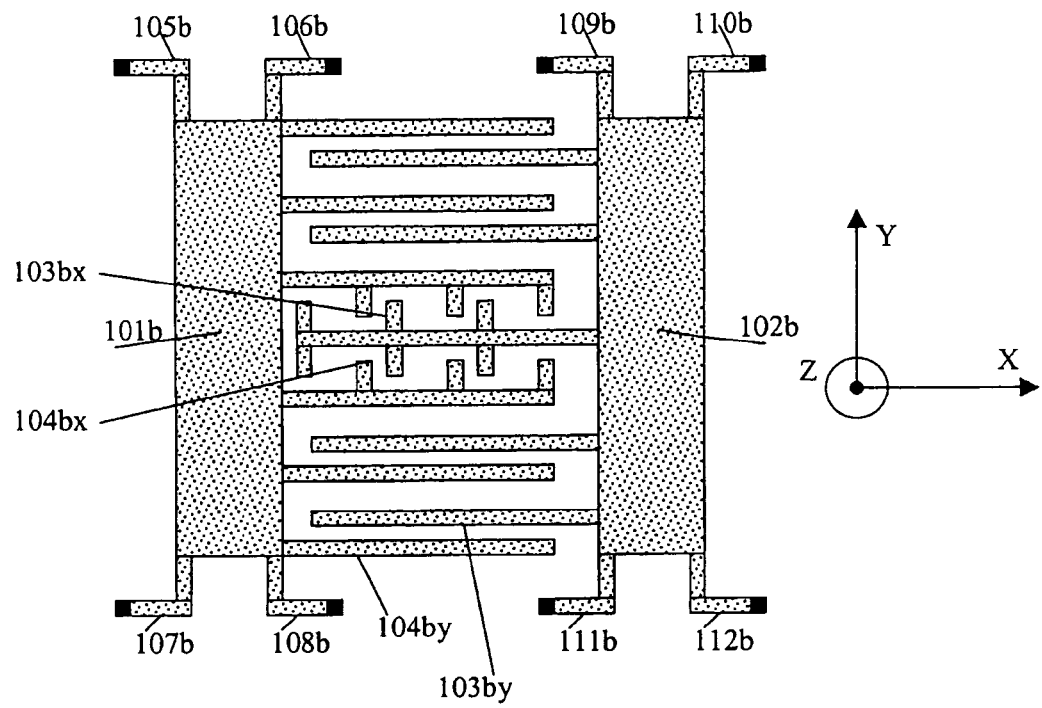

The embodiment of FIG. 1b is also similar to that of FIG. 1, but with the addition of means coupling the two masses together for movement along the y-axis as well as the x-axis. That means includes plates 103by, 104by which extend from the masses in the x-direction and are spaced apart along the y-axis to form the plates of a electrostatic coupling capacitor which couples the masses together for movement along the y-axis. Plates 103bx, 104bx couple the two masses together for movement along the x-axis, as in the embodiment of FIG. 1.

Figure 2:
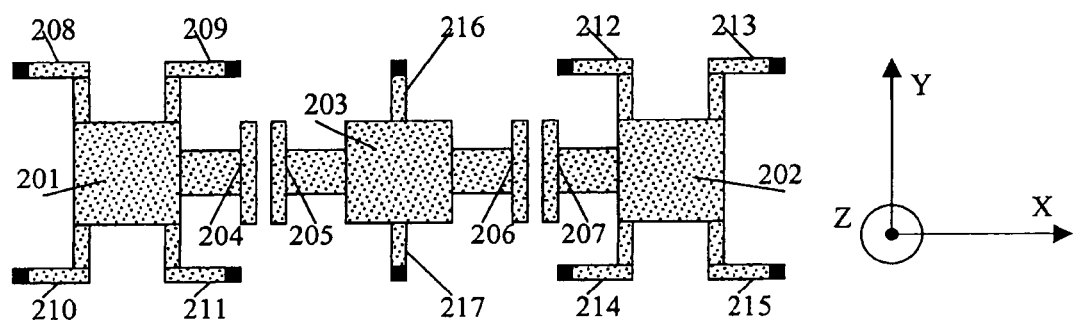

In the embodiment of FIG. 2, masses 201, 202 are coupled electrostatically through a third mass 203 which is positioned between them. Mass 201 is coupled to mass 203 by plates 204, 205 which are affixed to the two masses and disposed in spaced, facing relationship, and mass 202 is coupled to mass 203 in a similar manner by plates 206, 207.

Masses 201, 202 and 203 are suspended by beams 208–211, 212–215 and 216–217, respectively, with one end of each beam being anchored to the substrate. Beams 208–211 and 212–215 are L-shaped, with arms extending in the x- and y-directions, thereby allowing masses 201, 202 to move in both the x-direction and the y-direction. Beams 216, 217 extend in the y-direction only, and allow mass 203 to move only in the x-direction. It is preferable that the entire design be symmetrical about both the x-axis and the y-axis relative to the center of the structure.

Voltages are applied between mass 201, 203 and between masses 202, 203. For the anti-phase resonance mode of masses 201, 202 in the x-direction, the total spring constant of resonance is determined by the spring constants of beams 208–211 and 212–215, and the equivalent negative spring constants of the forces applied by capacitor plates 204, 205 and 206, 207. For the in-phase resonance mode of masses 201, 202 in the x-direction, the spring constant of beams 216, 217 is also a factor in the total spring constant and the resonance frequency. Therefore, the anti-phase mode resonance frequency can be separated from the in-phase mode resonance frequency.

For sensing rotation about an axis in the plane of the device instead of one perpendicular to it, beams 208–215 can be modified to allow for motion in the z-direction while retaining the electrostatic coupling of the masses along the x-axis. The Coriolis-induced motion will then be directed along the z-axis, and the y-axis will be the input axis about which rotation is sensed. In this modified embodiment, electrodes for sensing the Coriolis-induced motion would be positioned above and/or below the masses, along the z-axis.

Figure 3:
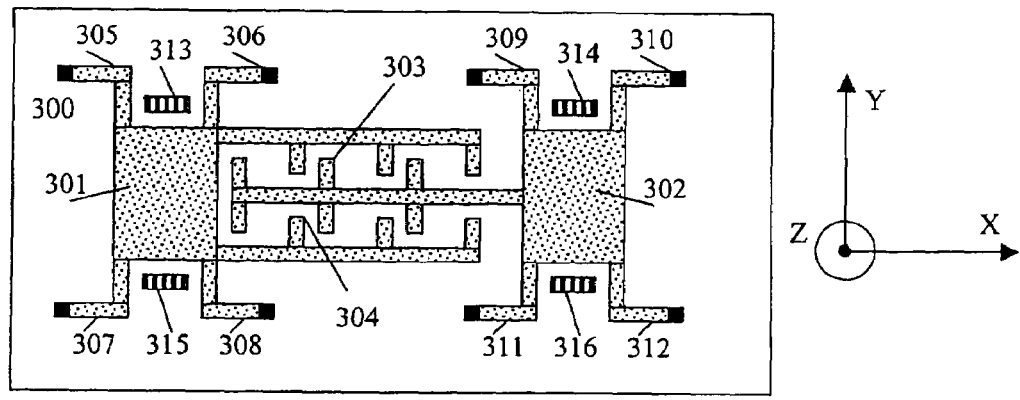

The embodiment of FIG. 3 is similar to the embodiment of FIG. 1, with electrodes 313–316 for sensing the response to Coriolis-induced motion along the y-axis. As in the embodiment of FIG. 1, masses 301, 302, beams 305–308 and 309–312, and capacitor plates 303, 304 are suspended above substrate 300. Electrodes 313–316 are mounted on the substrate in fixed positions and spaced above and below the masses in the y-direction.

When masses 301, 302 are driven to dither in the anti-phase mode in the x-direction, and the device is rotated about the z-axis, Coriolis forces are generated on the masses 301, 302 differentially, causing the masses 302 to dither differentially in the y-direction. That motion is detected as a measure of the rate of rotation by the capacitors formed by electrodes 313–316 and the vibrating masses.

Being positioned on opposite sides of the masses, electrodes 313–316 combine with the masses to form a differential capacitive detector. The differential detection is helpful in eliminating the interference from linear accelerations since that interference is treated as a common-mode signal rather than a differential signal.

As shown, the embodiment of FIG. 3 is sensitive to rotation about the z-axis, with the motion which is sensed occurring along the y-axis. If desired, that embodiment can also be modified to detect rotation about the y-axis, in which case capacitor plates 313–316 would be located above and or below the masses along the z-axis.

Figure 3A:
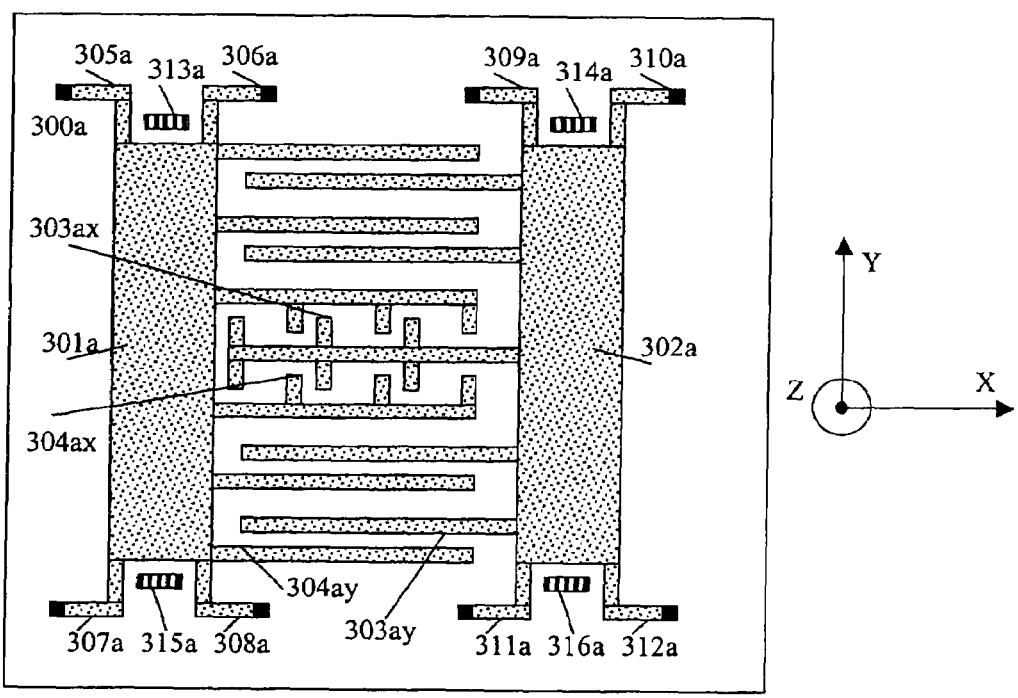

The embodiment of FIG. 3a is similar to those of FIGS. 1b and 3, with capacitor plates 303ax, 304ax providing coupling between masses 301a, 302a for motion in the x-direction, plates 303ay, 304ay providing coupling for motion in the y-direction, and plates 313a–316a forming capacitors with the masses for detecting motion of the masses in the y-direction.

Figure 4:
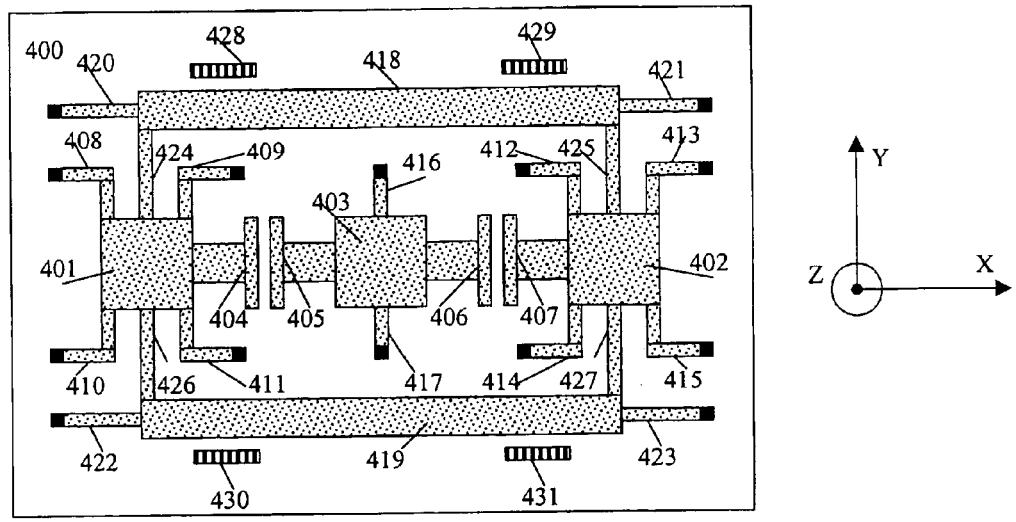

FIG. 4 shows another embodiment in which the two masses are connected together electrostatically through a third mass positioned between them. In this embodiment, changes in motion along the y-axis due to Coriolis forces are transferred to movable sensing elements through mechanical beams and are then detected as a measure of rotation rate, preferably using capacitive detectors. In the absence of a rotation-induced Coriolis force, the sensing elements are relatively motionless and unaffected by the dithering of the masses along the x-axis, thereby minimizing quadrature error.

As in the embodiment of FIG. 2, masses 401, 402 and 403, capacitor plates 404, 405 and 406, 407, and beams 408–411, 412–415, and 416, 417 are suspended above substrate 400. In addition, sensing masses 418, 419 are also suspended above the substrate by beams 420, 421 and 422, 423, and connected to masses 401, 402 by beams 424, 425 and 426, 427 for movement in the y-direction. Fixed sensing elements 428–431 are affixed to the substrate near the sensing masses and capacitively coupled to them.

When masses 401, 402 are driven to dither in the anti-phase mode in the x-direction and the device is rotated about the z-axis, Coriolis forces are generated differentially on masses 401, 402, causing them to dither differentially in the y-direction. This motion is transferred to sensing masses 418, 419 by beams 424, 425 and 426, 427. Since beams 420, 421 and 422, 423 extend only in the x-direction, the sensing masses are held in such manner that they are minimally affected by the dithering of the vibrating masses in the x-direction in the absence of Coriolis forces. The motion of sensing masses 418, 419 is detected by changes in capacitance between those masses and electrode plates 428–431.

Figure 5:
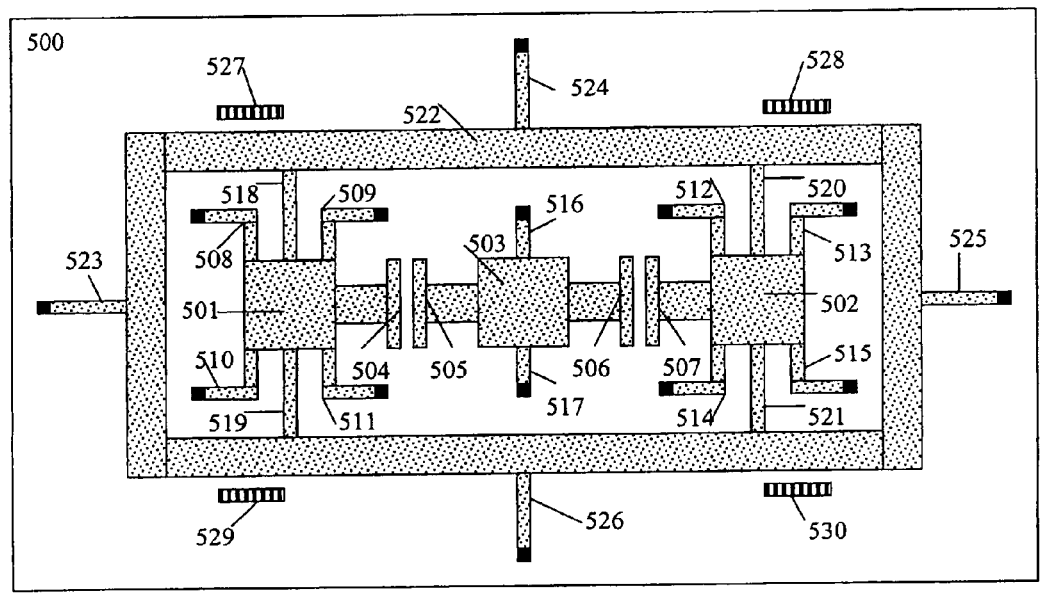

Another embodiment of a gyroscope having two masses connected electrostatically together through a third mass and coupled to a movable sensing element is shown in FIG. 5. As in the previous embodiments, masses 501, 502 and 503, capacitor plates 504, 505 and 506, 507, and beams 508–511, 512–515, and 516, 517 are suspended above substrate 500.

A sensing element or mass 522 in the form of a rigid rectangular frame is suspended above the substrate by beams 523–526 and is connected to masses 501, 502 by beams 518, 519 and 520, 521. Stationary sensing elements 527–530 are affixed to the substrate near the sensing mass and capacitively coupled to it.

When masses 501, 502 are driven to dither in the anti-phase mode in the x-direction and the device is rotated about the z-axis, Coriolis forces are generated on the masses 501, 502 differentially and cause those masses to dither differentially in the y-direction. That motion is transferred to sensing mass 522 by beams 518–521. Since those beams are extend in the y-direction and are relatively stiff in that direction, motion in the y-direction is transferred readily, but the differential dithering of the masses in the x-axis is not transferred to the sensing mass to any significant degree.

Beams 523–526 keep the sensing mass from being influenced by the dithering of masses 501, 502 in the x-direction when there is no Coriolis force. Beams 523–526 also hold mass 522 firmly and inhibit motional changes in response to linear accelerations along the x- and y-axes, but respond readily to any change in rotational motion about the z-axis caused by the Coriolis forces. The motion of sensing mass 522 is detected by changes in capacitance between that mass and electrode plates 427–430.

Figure 6:
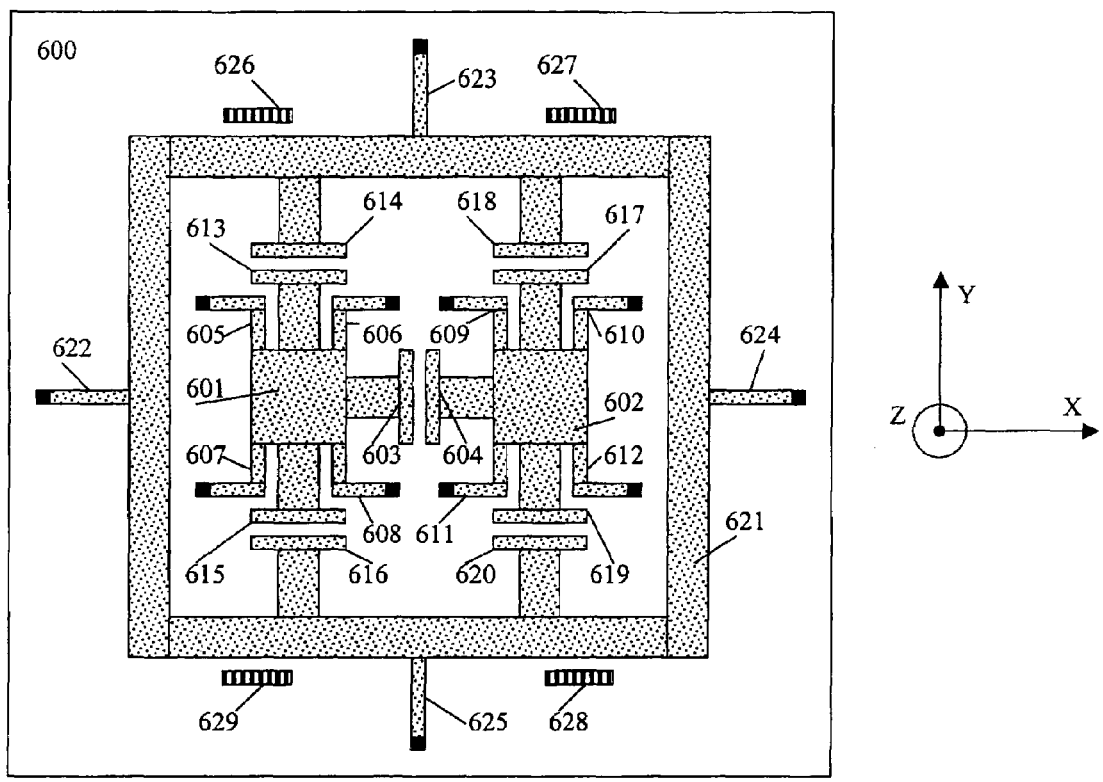

Another embodiment with a rigid sensing element or mass is illustrated in FIG. 6. In this embodiment, masses 601, 602 are connected together electrostatically by plates 603, 604, and suspended above substrate 600 by L-shaped beams 605–608 and 609–612. Those masses are also connected electrostatically to a surrounding sensing mass 621 in the form of a rigid rectangular frame by plates 613, 614; 615, 616; 617, 618 and 619, 620. The sensing mass is suspended from the substrate by beams 622–625, and electrode plates 626–629 are affixed to the substrate and capacitively coupled to the sensing mass to detect movement of it.

When masses 601, 602 are driven to dither in the anti-phase mode in the x-direction and the device is rotated about the z-axis, Coriolis forces are generated on those masses differentially and cause them to dither differentially in the y-direction. Those motional changes are transferred to sensing mass 621 through electrode plates 613, 614; 615, 616; 617, 618 and 619, 620. The electrode pairs form parallel plate capacitors, and when voltages are applied between them, the electrostatic forces between the plates in each pair are a function of the relative positions of the electrode pairs in the y-direction.

Beams 622–625 keep mass 621 relatively motionless when there is no Coriolis force, thereby reducing quadrature error. They also hold mass 621 firmly and thereby effectively inhibit changes in motion caused by linear acceleration along the x- and y-axes, yet can respond readily to changes in rotational motion about the z-axis due to Coriolis forces. As in the previous embodiments, the motion of sensing mass 621 is detected by changes in capacitance between that mass and electrode plates 626–629.

The invention has a number of important features and advantages. It provides a micromachined vibratory gyroscope which overcomes the shortcomings of prior art gyroscopes, including quadrature error, sensitivity to linear accelerations, momentum imbalance and mechanical coupling effects.

Cancellation of momentum imbalance is achieved by coupling two masses and driving them in the anti-phase mode to balance the driving momentum. The coupling is done though an electrostatic force that is a function of the relative positions of the two masses. The electrostatic force can be applied directly between the two masses or through one or more intermediate masses between the two driven masses.

Because the two masses are driven in the anti-phase mode, the output can be sensed differentially since the Coriolis forces are in opposite directions on the two masses. The effects of linear accelerations are treated as common-mode interferences and can be rejected by the signal processing electronics. Thus, the sensitivity to linear acceleration can be greatly reduced.

In some embodiments, the motional changes of the dithering masses caused by the Coriolis forces are transferred to one or more other bodies (i.e., sensing masses) through mechanical beams and/or electrostatic forces that are a function of the relative positions of the driven and sensing masses. The sensing masses are suspended in a manner such that they are relatively motionless when there is no Coriolis force, which results in quadrature error being greatly reduced.

The manner in which the sensing masses are suspended also inhibits motional changes in them in response to linear acceleration along the x- and y-axes, but allows them to respond readily to differential motion along the response axis (y-axis) due to Coriolis forces. Such designs have significantly reduced sensitivity to linear accelerations.

The micromachined gyroscope is built on a planar substrate, with two dithering masses coupled through electrostatic forces that are a function of the relative positions of the two masses. Such electrostatic forces can either be generated directly between the masses or through one or more intermediate masses. Such coupling results in different resonant frequencies for the anti-phase resonance mode and the in-phase resonance mode for resonances along the dither axis. This coupling technique is readily extended to micromachined vibratory gyroscopes having more than two masses.

Motional changes caused by Coriolis forces are transferred to one or more other movable masses or sensing bodies through mechanical beams and/or electrostatic forces that are a function of the relative positions of the dithering and sensing masses.

The sensing masses are suspended in such manner that they are maintained relatively motionless in the absence of Coriolis forces and are not influenced by the dithering of the vibrating masses along the dither axis.

The manner in which the sensing masses are suspended significantly inhibits motion of those masses in response to linear acceleration within the substrate plane, yet permits the sensing masses to respond readily to changes in motion caused by rotation about an axis perpendicular to the substrate plane.

The electrostatic coupling between the masses can be symmetrical or asymmetrical, and it can be used along the sense axis as well as along the drive axis.

While the currently preferred embodiment is a gyroscope sensitive to rotation about the z-axis, the electrostatic coupling of the drive mode is applicable to a gyroscope with an input axis along the y-axis as well.

Although the invention has been described with specific reference to a micromachined gyroscope, it will be understood that it is equally applicable to other devices in which vibratory masses are coupled together electrostatically.

It is apparent from the foregoing that a new and improved micromachined vibratory gyroscope has been provided. While only certain presently preferred embodiments have been described in detail, as will be apparent to those familiar with the art, certain changes and modifications can be made without departing from the scope of the invention as defined by the following claims.

What is claimed is:

1. A micromachined vibratory gyroscope, comprising: first and second masses mounted in a manner permitting anti-phase dithering motion along a first axis and differential motion along a second axis in response to a Coriolis force produced by rotation about a third axis, and means for coupling the masses together through electrostatic forces which are a function of the relative positions of the masses.

2. The micromachined vibratory gyroscope of claim 1 wherein the electrostatic coupling forces are directed along the first axis so that the masses have different resonant frequencies for anti-phase and in-phase motion along the first axis.

3. The micromachined vibratory gyroscope of claim 1 wherein the masses are coupled electrostatically along both the first axis and the second axis so that the masses have different resonant frequencies for anti-phase and in-phase motion along each of the first and second axes.

4. The micromachined vibratory gyroscope of claim 1 wherein the means for coupling the masses together includes a plurality of parallel plates connected to the masses for movement in concert with the masses.

5. The micromachined vibratory gyroscope of claim 4 wherein the plates connected to the first mass are spaced equally between the plates connected the second mass so that motion of the masses toward each other and away from each other results in substantially equal electrostatic forces.

6. The micromachined vibratory gyroscope of claim 1 wherein the means for coupling the masses together includes a third mass which is coupled electrostatically between the first and second masses.

7. The micromachined vibratory gyroscope of claim 1 further including a plurality of sensors capacitively coupled to the first and second masses for monitoring movement of the masses along the second axis.

8. The micromachined vibratory gyroscope of claim 1 further including a sensing element coupled to the first and second masses, and a plurality of sensors capacitively coupled to the sensing element for monitoring movement of the masses along the second axis.

9. The micromachined vibratory gyroscope of claim 8 wherein the sensing element is coupled to the masses electrostatically.

10. The micromachined vibratory gyroscope of claim 1 wherein the masses are spaced above a planar substrate, the first and second axes lie in a plane parallel to the substrate, and the third axis is perpendicular to the substrate.

11. The micromachined vibratory gyroscope of claim 1 wherein the masses are spaced above a planar substrate, the first and third axes lie in a plane parallel to the substrate, and the second axis is perpendicular to the substrate.

12. A micromachined rate sensor, comprising first and second masses which are coupled together electrostatically and mounted in a manner permitting anti-phase dithering motion along a first axis and differential motion along a second axis in response to a Coriolis force produced by rotation about a third axis.

13. The micromachined rate sensor of claim 12 wherein the first and second masses are coupled together through electrostatic forces which are a function of the relative positions of the masses.

14. The micromachined rate sensor of claim 12 wherein the electrostatic coupling forces are directed along the first axis so that the masses have different resonant frequencies for anti-phase and in-phase motion along the first axis.

15. The micromachined rate sensor of claim 12 wherein the messes are coupled electrostatically along both the first axis and the second axis so that the masses have different resonant frequencies for anti-phase and in-phase motion along each of the first and second axes.

16. The micromachined rate sensor of claim 12 further including a plurality of sensors capacitively coupled to the first and second masses for monitoring movement of the masses along the second axis.

17. The micromachined rate sensor of claim 12 further including a sensing element coupled to the first and second masses, and a plurality of sensors capacitively coupled to the sensing element for monitoring movement of the masses along the second axis.

18. The micromachined rate sensor of claim 17 wherein the sensing element is electrostatically coupled to the masses.

19. A micromachined rate sensor, comprising first and second masses which are coupled together electrostatically and mounted in a manner permitting anti-phase dithering along a first axis and differential motion along a second axis in response to a Coriolis force produced by rotation about a third axis, a sensing element comprising a rectangular frame which surrounds, is coplanar with, and is coupled to the first and second masses, and a plurality of sensors capacitively coupled to the sensing element for monitoring movement of the masses along the second axis.

20. The micromachined rate sensor of claim 12 wherein the first and second axes are perpendicular to each other and to the third axis.

21. A micromachined rate sensor, comprising: first and second masses mounted in a manner permitting anti-phase dithering motion along a first axis and movement in opposite directions along a second axis in response to a Coriolis force produced by rotation about a third axis, and a plurality of capacitive coupling plates attached to the masses and interleaved along the first axis to provide electrostatic coupling between the masses when a voltage is applied to the plates.

22. The micromachined rate sensor of claim 21 including additional coupling plates which are attached to the masses and interleaved along the second axis to provide electrostatic coupling between the masses along the second axis when a voltage is applied thereto.

23. A micromachined rate sensor, comprising: first and second masses mounted in a manner permitting anti-phase dithering motion along a first axis and movement in opposite directions along a second axis in response to a Coriolis force produced by rotation about a third axis, and capacitive coupling plates attached to the masses and disposed in facing relation to each other along the first axis to provide electrostatic coupling between the masses when a voltage is applied to the plates.

24. A micromachined rate sensor, comprising: first and second masses mounted in a manner permitting anti-phase dithering motion along a first axis and movement in opposite directions along a second axis in response to a Coriolis force produced by rotation about a third axis, a third mass mounted between the first and second masses in a manner permitting movement along the first axis, and capacitive coupling plates attached to the masses and disposed in facing relation to each other along the first axis to provide electrostatic coupling between the first and third masses and between the second and third masses when a voltage is applied to the plates.

25. A micromachined rate sensor comprising: first and second masses mounted in a manner permitting anti-phase dithering motion along a first axis and movement in opposite directions along a second axis in response to a Coriolis force produced by rotation about a third axis, a third mass mounted between the first and second masses in a manner permitting movement along the first axis, capacitive coupling plates attached to the masses and disposed in facing relation to each other along the first axis to provide electrostatic coupling between the first and third masses and between the second and third masses when a voltage is applied to the plates, and a sensing mass connected to the first and second masses for movement along the second axis with the first and second masses without impairing the motion of the first and second masses along the first axis.

26. The micromachined rate sensor of claim 25 wherein the sensing mass comprises a rectangular frame which surrounds and is coplanar with the first and second masses.

27. A micromachined rate sensor, comprising: first and second masses mounted in a manner permitting anti-phase dithering motion along a first axis and movement in opposite directions along a second axis in response to a Coriolis force produced by rotation about a third axis, capacitive coupling plates attached to the masses and disposed in facing relation to each other along the first axis to provide electrostatic coupling between the masses when a voltage is applied thereto, a sensing mass in the form of a rectangular frame which surrounds and is coplanar with the masses and is mounted in a manner preventing motion along the first and second axes while permitting rotation about the third axis, and capacitive coupling plates attached to the first and second masses and to the sensing mass disposed in facing relation to each other along the second axis to provide electrostatic coupling between the first and second masses and the sensing mass when a voltage is applied thereto.

* * * * *